(12) United States Patent
Kanamaru et al.

(10) Patent No.: US 11,572,930 B2
(45) Date of Patent: Feb. 7, 2023

(54) ANTIVIBRATION UNIT ATTACHMENT STRUCTURE

(71) Applicant: HONDA MOTOR CO., LTD., Tokyo (JP)

(72) Inventors: Keisuke Kanamaru, Wako (JP); Yasuhito Sato, Wako (JP); Hiroyuki Asase, Wako (JP); Masaaki Nishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 357 days.

(21) Appl. No.: 16/922,025

(22) Filed: Jul. 7, 2020

(65) Prior Publication Data

US 2021/0010561 A1  Jan. 14, 2021

(30) Foreign Application Priority Data

Jul. 12, 2019 (JP) .............................. JP2019-130139

(51) Int. Cl.
*F16F 15/08* (2006.01)
*F16F 3/10* (2006.01)
(Continued)

(52) U.S. Cl.
CPC .............. *F16F 15/085* (2013.01); *F16B 5/02* (2013.01); *F16F 3/093* (2013.01); *F16F 3/10* (2013.01);
(Continued)

(58) Field of Classification Search
CPC .. F16F 15/085; F16F 3/093; F16F 3/10; F16F 15/04; F16F 13/06; F16F 2224/0208;
(Continued)

(56) References Cited

U.S. PATENT DOCUMENTS 3,123,170 A * 3/1964 Bryant .................. B60K 11/04
165/69
4,141,143 A * 2/1979 Hirschkoff .......... B27B 17/0033
30/381
(Continued)

FOREIGN PATENT DOCUMENTS

JP          61-136032       6/1986
JP          2014-211183     11/2014

OTHER PUBLICATIONS

Japanese Office Action for Japanese Patent Application No. 2019-130139 dated Feb. 1, 2022.

*Primary Examiner* — Christopher Garft
*Assistant Examiner* — Michael McDuffie
(74) *Attorney, Agent, or Firm* — Amin, Turocy & Watson, LLP

(57) ABSTRACT

An antivibration unit attachment structure according to the present aspect includes: a vibration absorption part having a first elastic member which is elastically deformable in a first direction and which is connected to a vibration generation part; and a second elastic member which supports the vibration absorption part and which is connected to a vibration reception part. The second elastic member includes a movable part that extends from the vibration absorption part to both sides in a second direction and that is supported by the vibration reception part. The second elastic member is elastically deformable in the first direction and has an elastic coefficient different from that of the first elastic member. The vibration reception part includes a regulation member that comes into contact with at least one of the vibration absorption part and the second elastic member and that limits displacement of the second elastic member to the first direction.

7 Claims, 6 Drawing Sheets

(51) Int. Cl.
 *F16B 5/02* (2006.01)
 *F16F 3/093* (2006.01)
 *F16F 15/04* (2006.01)
 *B60K 5/12* (2006.01)
 *F16F 13/06* (2006.01)

(52) U.S. Cl.
 CPC ............ *F16F 15/04* (2013.01); *B60K 5/1208* (2013.01); *F16F 13/06* (2013.01); *F16F 2224/0208* (2013.01)

(58) Field of Classification Search
 CPC .......... F16F 13/24; F16B 5/02; F16B 5/0241; B60K 5/1208; B60K 5/12; B60K 5/1216; B60K 5/1225
 USPC ............... 248/560, 562, 580, 634, 638, 573
 See application file for complete search history.

(56) References Cited

U.S. PATENT DOCUMENTS

| | | | | |
|---|---|---|---|---|
| 4,522,165 | A * | 6/1985 | Ogawa | B32B 5/245 |
| | | | | 181/204 |
| 6,896,098 | B2 * | 5/2005 | Vom Stein | B29C 45/14467 |
| | | | | 181/207 |
| 10,876,593 | B2 * | 12/2020 | Shimada | F16F 1/376 |
| 2006/0043656 | A1 * | 3/2006 | Shimizu | F16F 1/3849 |
| | | | | 267/140.13 |
| 2013/0146743 | A1 * | 6/2013 | Okamura | F16F 13/103 |
| | | | | 267/140.13 |
| 2015/0240901 | A1 * | 8/2015 | Ishikawa | F16F 1/3863 |
| | | | | 248/634 |
| 2015/0252870 | A1 * | 9/2015 | Kashihara | F16F 1/3849 |
| | | | | 248/634 |
| 2015/0276010 | A1 * | 10/2015 | Nakamura | F16F 15/08 |
| | | | | 248/634 |
| 2015/0345583 | A1 * | 12/2015 | Ishikawa | B60K 5/1291 |
| | | | | 267/141 |
| 2016/0138673 | A1 * | 5/2016 | Hattori | F16F 3/0873 |
| | | | | 248/634 |

* cited by examiner

ANTIVIBRATION UNIT ATTACHMENT STRUCTURE

CROSS-REFERENCE TO RELATED APPLICATION

Priority is claimed on Japanese Patent Application No. 2019-130139 filed on Jul. 12, 2019, the contents of which are incorporated herein by reference.

BACKGROUND

Field of the Invention

The present invention relates to an antivibration unit attachment structure.

Background

In the related art, a configuration is known in which when a power unit in which a drive source (for example, an engine, a motor, or the like), a transmission, and the like are integrally combined is attached to a vehicle body frame, a mount device is interposed between the power unit and the vehicle body frame. The mount device prevents a vibration generated by driving of the drive source itself or a vibration of the drive source generated by a vibration input from a road surface during traveling from transmitting to the vehicle body frame.

For example, Japanese Unexamined Patent Application, First Publication No. 61-136032 discloses a mount device that includes a partition member inside a liquid seal mount and attenuates a vibration at a low frequency and at a medium-to-high-frequency by controlling the opening and closing of the partition member in accordance with a vibration input from a power unit.

SUMMARY

In the liquid seal mount device disclosed in Japanese Unexamined Patent Application, First Publication No. S61-136032, precise tuning or the like is required for effectively attenuating a vibration in a wide range from a low frequency to a medium-to-high frequency. Accordingly, it is difficult to attenuate a vibration in a wide frequency band while achieving a simple configuration and a low cost.

An aspect of the present invention provides an antivibration unit attachment structure capable of attenuating a vibration in a wide frequency band while achieving a simple configuration and a low cost.

An antivibration unit attachment structure according to a first aspect of the present invention includes: a vibration absorption part having a first elastic member which is elastically deformable in a first direction and which is connected to one member that is one of a vibration generation part and a vibration reception part; and a second elastic member which supports the vibration absorption part and which is connected to another member that is the other of the vibration generation part and the vibration reception part, wherein the second elastic member includes a movable part that extends from the vibration absorption part to both sides at least in a second direction intersecting the first direction and that is supported by the other member, the second elastic member is elastically deformable in the first direction and has an elastic coefficient different from that of the first elastic member, and the vibration reception part includes a regulation member that comes into contact with at least one of the vibration absorption part and the second elastic member and that limits displacement of the second elastic member to the first direction.

A second aspect of the present invention is the antivibration unit attachment structure according to the first aspect described above, wherein the other member may include a leg part that supports the movable part, and the regulation member may include an opposing protruding part that faces, in the first direction, a portion of the movable part that extends from the leg part toward the vibration absorption part and that limits displacement of the movable part.

A third aspect of the present invention is the antivibration unit attachment structure according to the second aspect described above, wherein the opposing protruding part may face, in the second direction throughout, the portion of the movable part that extends from the leg part toward the vibration absorption part.

A fourth aspect of the present invention is the antivibration unit attachment structure according to the second or third aspect described above, wherein the other member may include a bridge part that connects together portions of the leg part that face each other in the second direction, and a projection portion that projects in the first direction, that comes into contact with at least one of the vibration absorption part and the one member, and that limits displacement of the first elastic member to the first direction may be provided on a portion of the bridge part that overlaps at least one of the vibration absorption part and the one member when seen from the first direction.

A fifth aspect of the present invention is the antivibration unit attachment structure according to any of the second to fourth aspects described above, wherein the regulation member may include a sandwiching part, the sandwiching part and the leg part sandwiching the movable part, and a spacer part that forms a gap in the first direction between the opposing protruding part and the movable part may be provided on at least one of the sandwiching part and the movable part.

A sixth aspect of the present invention is the antivibration unit attachment structure according to any of the first to fifth aspects described above, wherein the second elastic member may include a holder part that opens to one direction in the first direction and that holds the vibration absorption part, and an engagement part that extends inward from an open edge of the holder part and that engages with the vibration absorption part from the one direction in the first direction.

A seventh aspect of the present invention is the antivibration unit attachment structure according to any of the first to sixth aspects described above, wherein the regulation member may include an arch part that straddles the first elastic member in the first direction, and the arch part may face the first elastic member in the first direction and may limit displacement of the first elastic member.

An eighth aspect of the present invention is the antivibration unit attachment structure according to any of the first to seventh aspects described above, wherein the regulation member may be formed of a resin material, and the regulation member may include a compression part further compressed than another part by a press process.

According to the first aspect described above, the vibration can be attenuated by the elastic deformation of the first elastic member and the second elastic member with respect to the vibration generated by, for example, the vibration generation part. Thereby, it is possible to prevent the vibration from being transmitted to the vibration reception part.

Specifically, according to the first aspect, by differentiating the elastic coefficients of the first elastic member and the second elastic member, resonant frequencies of the elastic members can be differentiated, and vibrations in different frequency regions can be effectively attenuated. In this case, for example, the vibration in the low-frequency region can be attenuated by the elastic member having a low elastic coefficient among the first elastic member and the second elastic member, and the vibration in the medium-to-high-frequency region can be attenuated by the elastic member having a high elastic coefficient among the first elastic member and the second elastic member.

Furthermore, according to the first aspect, when the second elastic member is elastically displaced together with the vibration absorption part relative to the other member, at least one of the vibration absorption part and the second elastic member comes into contact with the regulation member, and thereby, it is possible to limit the displacement of the second elastic member to the first direction. Thereby, it is possible to prevent the second elastic member from being damaged when an excessive vibration is input.

According to the second aspect described above, since when the portion of the movable part of the second elastic member that extends from the leg part toward the vibration absorption part is displaced in the first direction, the portion comes into contact with the opposing protruding part of the regulation member, it is possible to limit deformation of the movable part. Specifically, the opposing protruding part comes into direct contact with the movable part itself, and thereby, it is possible to stabilize the vibration of the movable part.

According to the third aspect described above, since the opposing protruding part faces throughout the portion of the movable part that extends from the leg part toward the vibration absorption part, the contact area between the regulation member (opposing protruding part) and the second elastic member (movable part) becomes larger. Therefore, it is possible to further stably limit the deformation of the movable part.

According to the fourth aspect described above, at least one of the vibration absorption part and the one member comes into contact with the projection portion, and thereby, it is possible to limit the displacement of the first elastic member to the first direction. Thereby, it is possible to prevent the deformation of the vibration absorption part or the second elastic member due to an excessive vibration input from the vibration generation part. Therefore, it is possible to prevent stress concentration generated at the portion of the movable part that extends from the leg part toward the vibration absorption part.

Further, a portion of the bridge part is projected as the projection portion, and thereby, it is possible to reduce the size or the weight of the vibration reception part compared to a case in which the entire bridge part is projected.

According to the fifth aspect described above, the gap is actively formed between the opposing protruding part and the movable part by the spacer part, and thereby, the movable part is easily vibrated in the first direction such that the sandwiching part is a pivot point. Thereby, it is possible to effectively prevent the vibration.

According to the sixth aspect described above, since the holder part opens to one side in the first direction, the center of gravity of the vibration absorption part is easily located closer to the other side in the first direction than the movable part. Thereby, it is possible to easily stabilize the vibration of the movable part while stably holding the vibration absorption part.

Moreover, since the vibration absorption part is engaged with the engagement part, it is possible to prevent the vibration absorption part from being displaced or dropping out relative to the holder part, and it is possible to stably hold the vibration absorption part.

According to the seventh aspect described above, when the first elastic member is displaced due to the vibration, the vibration absorption part comes into contact with the arch part, and thereby, it is possible to prevent the displacement of the vibration generation part in the first direction.

According to the eighth aspect described above, since the compression part is formed of the compressed resin material, the resin density of the compressed portion is increased, and the strength of the regulation member is increased. Thereby, in a case where at least one of the vibration absorption part and the second elastic member comes into contact with the regulation member, it is easier to prevent the regulation member from being damaged or the like.

DESCRIPTION OF THE EMBODIMENTS

Hereinafter, an antivibration unit attachment structure 1 according to an embodiment of the present invention will be described with reference to the drawings.

Hereinafter, the vertical direction is described as a first direction D1 (an arrow UP indicates upward).

In a plan view seen from the first direction D1, directions orthogonal to each other are defined as a second direction D2 and a third direction D3. In addition, directions such as a front-to-rear direction, the vertical direction, a right-to-left direction, and the like are the same as directions in a vehicle unless otherwise stated. In the following description, for example, a relative or absolute arrangement or expression such as "parallel", "orthogonal", "crossing", "center", or "coaxial" not only strictly represents such an arrangement but also represents a state in which the position is relatively displaced with a tolerance or an angle or a distance sufficient to obtain the same function.

[Low-Frequency Vibration]

A low-frequency vibration is a vibration having a frequency of about 0 to 80 Hz. For example, a vibration generated at the time of idling, at the time of low-speed traveling, or the like corresponds to the low-frequency vibration.

[Medium-to-High-Frequency Vibration]

A medium-to-high-frequency vibration is a medium-frequency vibration and a high-frequency vibration.

The medium-frequency vibration refers to a vibration having a frequency of 200 to 500 Hz. For example, a pedal vibration or the like corresponds to the medium-frequency vibration.

The high-frequency vibration refers to a vibration having a frequency of 500 to 10 kHz. For example, a vibration generated by an acceleration engine sound, a gear sound, or the like corresponds to the high-frequency vibration.

[Antivibration Unit Attachment Structure]

Figure 1:
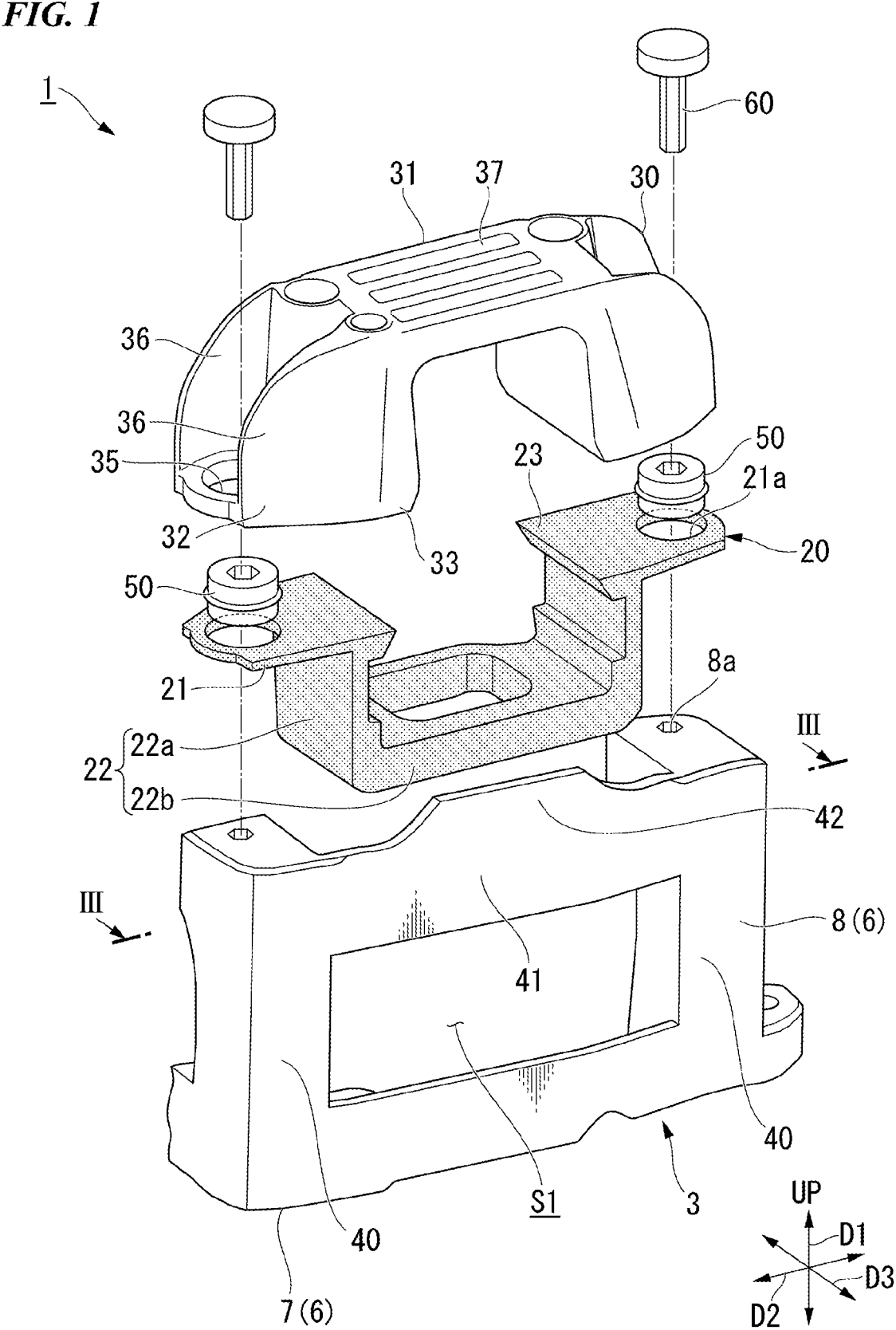
FIG. 1 is an exploded perspective view of an antivibration unit attachment structure according to an embodiment of the present invention.
Figure 2:
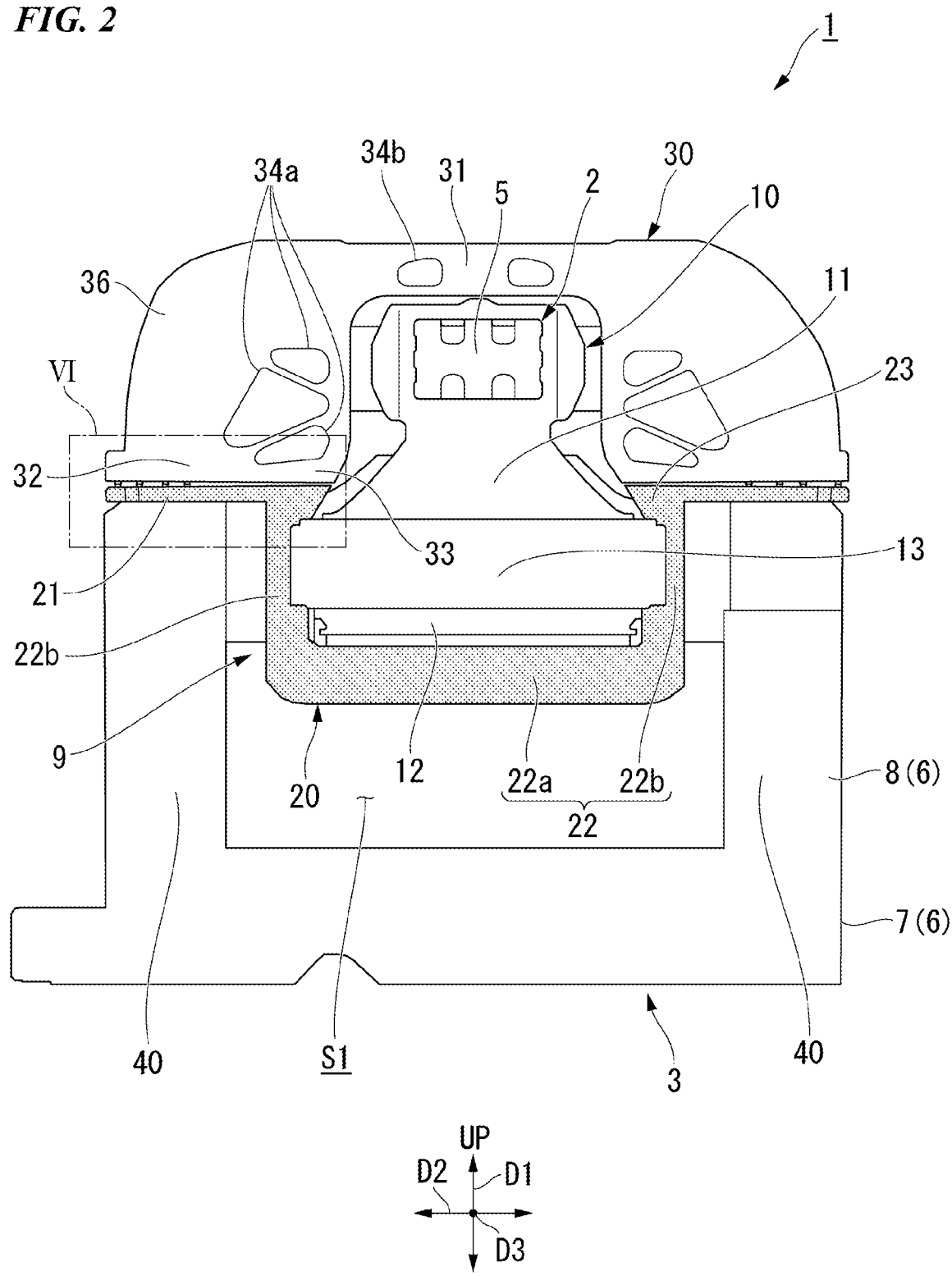
FIG. 2 is a side view of the antivibration unit attachment structure according to the embodiment when seen from one side of a third direction.

FIG. 1 is an exploded perspective view of the antivibration unit attachment structure 1. FIG. 2 is a side view of the antivibration unit attachment structure 1 when seen from one side of the third direction D3.

As shown in FIG. 1 and FIG. 2, the antivibration unit attachment structure 1 of the present embodiment is mounted on a vehicle and is a structure for absorbing and attenuating a vibration generated at a vibration generation part 2. The antivibration unit attachment structure 1 of the present embodiment includes the vibration generation part (one member) 2, a vibration reception part (another member, the other member) 3, and an antivibration unit 9.

<Vibration Generation Part>

As shown in FIG. 2, the vibration generation part 2 is housed in a power unit room (for example, an engine room, a motor room, or the like) defined at a front part of a vehicle. The vibration generation part 2 includes, for example, a power unit (not shown) and a support bracket 5.

The power unit has a configuration in which a drive source such as an engine or a motor, a transmission, and the like are housed in a housing. A drive force generated by the power unit is transmitted to a wheel, and thereby, the vehicle travels.

The support bracket 5 protrudes in the second direction D2 from a lower part of the housing. The position, the number, and the like of the support bracket 5 in the housing can be appropriately changed.

<Vibration Reception Part>

As shown in FIG. 1 and FIG. 2, the vibration reception part 3 is mainly a vehicle body frame. The vibration reception part 3 includes, for example, at least a sub-frame 6 and a regulation member 30.

The sub-frame 6 supports the vibration generation part 2 via the antivibration unit 9 described above. The sub-frame 6 is attached from below to a pair of right and left front side frames (not shown) arranged on a vehicle body. Specifically, the sub-frame 6 includes a frame main body 7 that connects together the front side frames and a mount support part 8 that protrudes upward from the frame main body 7.

Figure 3:
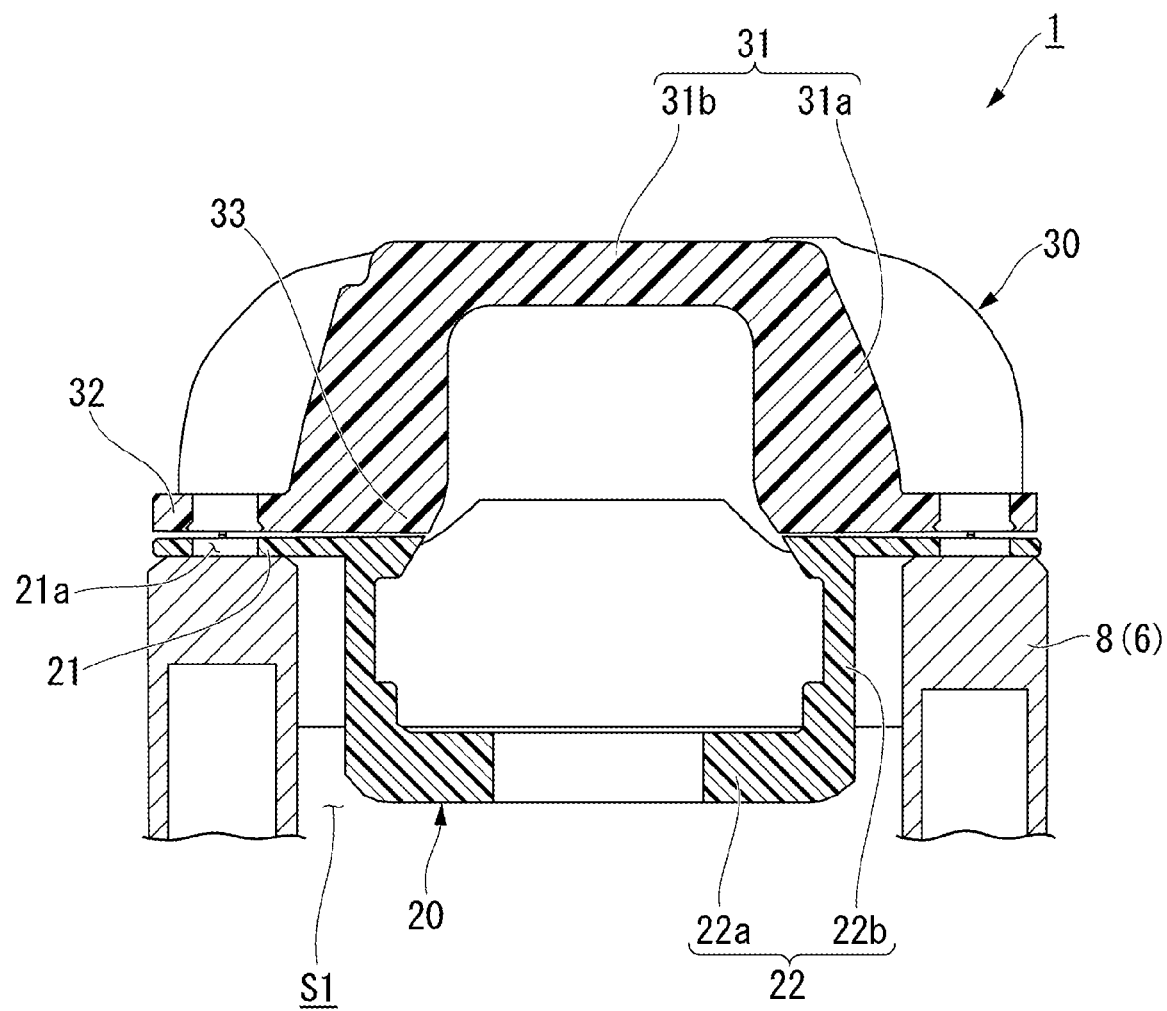
FIG. 3 is an enlarged cross-sectional view corresponding to a line of FIG. 1.
Figure 3:
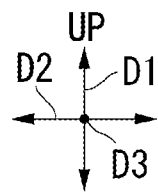

FIG. 3 is an enlarged cross-sectional view corresponding to a line of FIG. 1.

Figure 4:
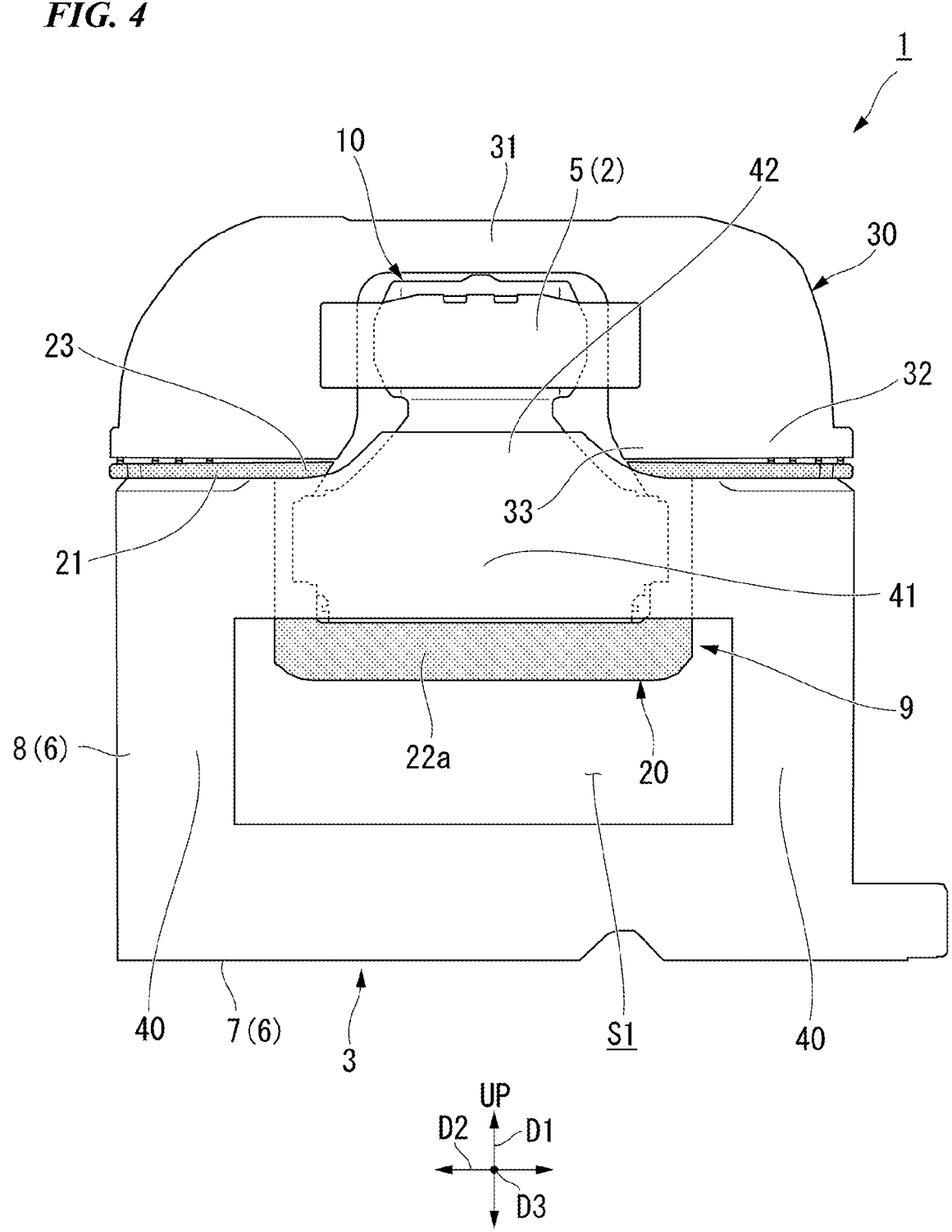
FIG. 4 is a side view of the antivibration unit attachment structure according to the embodiment when seen from another side of the third direction.

FIG. 4 is a side view of the antivibration unit attachment structure 1 when seen from another side of the third direction D3.

As shown in FIG. 1 to FIG. 4, the mount support part 8 includes a pair of leg parts 40, a bridge part 41, and a projection portion 42.

The pair of leg parts 40 protrudes upward from opposing positions in the second direction D2 in the frame main body 7. A space between the leg parts 40 facing each other defines a vibration-allowing space S1.

In the present embodiment, the vibration-allowing space S1 opens to an upward direction and both sides of the third direction D3. However, the leg part 40 can be appropriately changed as long as the leg part 40 has a configuration in which the vibration-allowing space S1 opens to at least the upward direction. In this case, the leg part 40 is not limited to the pair of leg parts 40 but may have, for example, a cylindrical shape or the like.

As shown in FIG. 1 and FIG. 4, the bridge part 41 connects together another-side end portions in the third direction D3 of upper end portions of the pair of leg parts 40.

The projection portion 42 projects upward from a center portion in the second direction D2 of the bridge part 41. The projection portion 42 is formed in a trapezoidal shape in a front view seen from the third direction D3. Specifically, a width in the second direction D2 of the projection portion 42 is gradually decreased toward the upward direction. However, the width in the second direction D2 of the projection portion 42 may be uniform throughout. In the present embodiment, an upper end surface of the projection portion 42 is a flat surface orthogonal to the first direction D1. Details of the regulation member 30 will be described later.

<Antivibration Unit>

As shown in FIG. 2, the antivibration unit 9 includes a vibration absorption part 10 and a mount-holding part (second elastic member) 20.

<Vibration Absorption Part>

The vibration absorption part 10 is, for example, a liquid seal mount member. Specifically, the vibration absorption part 10 has a configuration in which a space defined by, for example, an elastic body (first elastic member) 11 and a diaphragm 12 is partitioned by a partition member (not shown) in a main liquid chamber and a sub-liquid chamber. The vibration absorption part 10 is integrally assembled by an assembly member 13 in a state where the elastic body 11, the diaphragm 12, and the partition member are aligned in the first direction D1.

The elastic body 11 is formed in a taper shape of which the diameter is gradually decreased toward the upward direction from the assembly member 13. The support bracket 5 described above is supported by an upper end part of the elastic body 11.

An orifice flow path that allows the main liquid chamber and the sub-liquid chamber to communicate with each other is formed on the partition member.

The vibration absorption part 10 attenuates the vibration, for example, by the elastic body 11 or the diaphragm 12 elastically deforming in response to a vibration generated at the vibration generation part 2 or by a liquid flowing back and forth between the main liquid chamber and the sub-liquid chamber through the orifice flow path. In the vibration absorption part 10 of the present embodiment, the elastic coefficient of the elastic body 11 and the like are set such that the low-frequency vibration can be mainly attenuated (such that the resonant frequency is included in the low-frequency band).

<Mount-Holding Part>

The mount-holding part 20 supports the vibration absorption part 10 and is connected to the vibration reception part 3. The mount-holding part 20 defines a hat shape that opens to the upward direction in a front view seen from the third direction D3. Specifically, the mount-holding part 20 includes a movable part 21, a holder part 22, and an engagement part 23. The mount-holding part 20 of the present embodiment is integrally formed of a polyamide resin material (nylon 66, nylon 6, aromatic nylon) including a fiber-reinforced aliphatic backbone such as glass or carbon. However, the mount-holding part 20 may be integrally formed of a metal material or the like.

Each movable part 21 is supported by an upper end surface of each leg part 40. Front end portions of the movable parts 21 extend in a cantilever manner from each leg part 40 toward a direction (hereinafter, referred to as an inside of the second direction D2) in which the front end portions face each other. Each movable part 21 is elastically deformable in first direction D1. In the mount-holding part 20 (movable part 21) of the present embodiment, the elastic coefficient and the like are set such that the medium-to-highfrequency vibration can be mainly attenuated (such that the resonant frequency is included in the medium-to-high-frequency band). In the present embodiment, the elastic coefficient of the mount-holding part 20 (movable part 21) is higher than the elastic coefficient of the elastic body 11 described above. Accordingly, the resonant frequency of the movable part 21 is higher than the resonant frequency of the elastic body 11.

Figure 5:
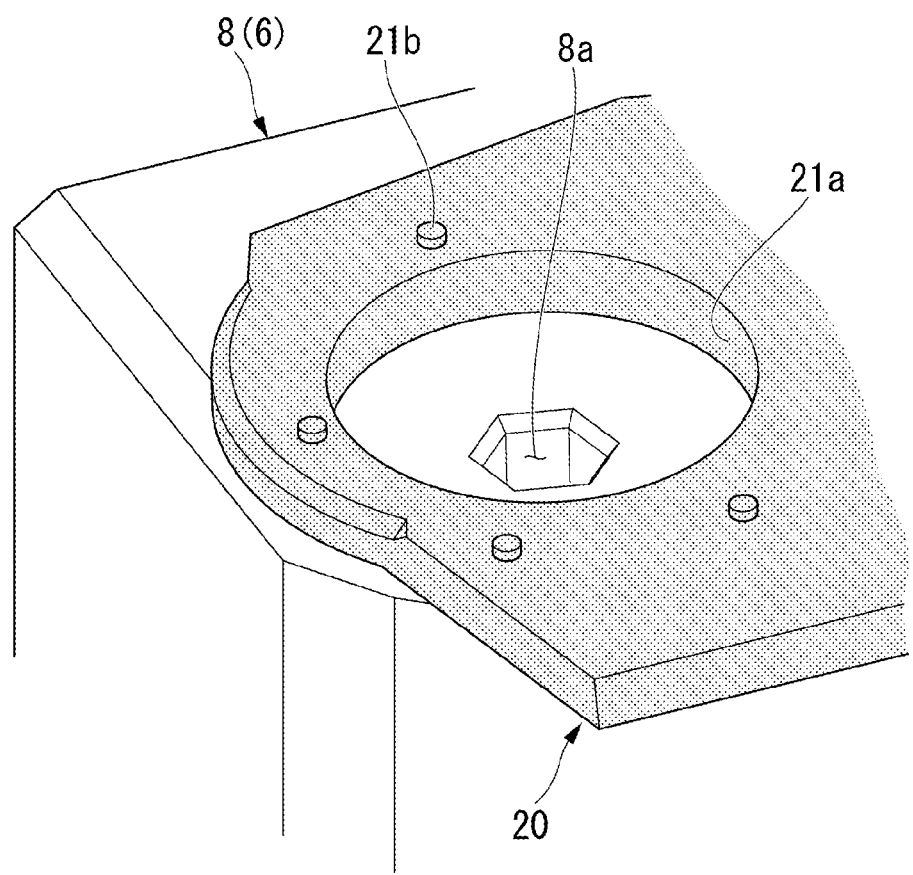
FIG. 5 is an enlarged perspective view of the antivibration unit attachment structure in a state where a regulation member is removed according to the embodiment.

FIG. 5 is an enlarged perspective view of the antivibration unit attachment structure 1 in a state where the regulation member 30 is removed.

As shown in FIG. 5, a base end portion of the movable part 21 (an outer end portion in the second direction D2) overlaps with an upper end surface of the leg part 40 in a plan view. A penetration hole 21a that penetrates through the movable part 21 in the first direction D1 is formed on the base end portion of the movable part 21. The penetration hole 21a is formed to have a larger diameter than that of an attachment hole 8a formed on the leg part 40. A protrusion portion (spacer part) 21b that protrudes upward is formed on the base end portion of the movable part 21 at a position located around the penetration hole 21a. A plurality of protrusion portions 21b are formed in the movable part 21 at intervals so as to surround the penetration hole 21a. However, the protrusion portion 21b may be formed continuously so as to surround the penetration hole 21a.

As shown in FIG. 2, the holder part 22 connects together front end portions (inner end portions in the second direction D2) of the movable parts 21. The holder part 22 is formed in a U shape that opens upward in a front view. Specifically, the holder part 22 includes a bottom wall portion 22a and a side wall portion 22b that extends upward from both ends in the second direction D2 of the bottom wall portion 22a.

An upper end of the side wall portion 22b located on one side in the second direction D2 is connected to a front end portion of the movable part 21 located on one side in the second direction D2. An upper end of the side wall portion 22b located on the other side in the second direction D2 is connected to a front end portion of the movable part 21 located on the other side in the second direction D2.

The vibration absorption part 10 described above is held inside the holder part 22. Specifically, the assembly member 13 of the vibration absorption part 10 is fitted inside the holder part 22. Thereby, the vibration absorption part 10 is held by the holder part 22 in a state where the elastic body 11 protrudes upward from an opening surface of the holder part 22. A lower portion of the vibration absorption part 10 of the present embodiment is arranged in the vibration-allowing space S1, and thereby, the center of gravity of the vibration absorption part 10 can be preferably located at a lower position than the movable part 21. Further, in the second direction D2, the center of gravity of the vibration absorption part 10 can be preferably located at a middle position between fixation points (the penetration hole 21a described above) of the movable parts 21. Further, in the third direction D3, the center of gravity of the vibration absorption part 10 can be preferably located within the width in the third direction D3 of the leg part 40. The present embodiment is described using a configuration in which both sides in the third direction D3 of the holder part 22 are open; however, the embodiment is not limited to the configuration. The holder part 22 can be appropriately changed as long as the holder part 22 has a shape that can hold the vibration absorption part 10.

The engagement part 23 protrudes inward in the second direction D2 from an open edge (an upper end edge of the side wall portion 22b) of the holder part 22. A lower surface of the engagement part 23 is engaged, from above, with an upper end edge of the assembly member 13 in the vibration absorption part 10. The engagement part 23 regulates an upward movement of the vibration absorption part 10 relative to the holder part 22. In the present embodiment, an inner end surface in the second direction D2 of the engagement part 23 is formed in an inclined surface that extends inward in the second direction D2 from a lower side toward an upper side. In the present embodiment, an upper surface of the engagement part 23 is located on the same plane as an upper surface of the movable part 21. However, the engagement part 23 may be located at a higher or lower position relative to the movable part 21.

<Regulation Member>

The regulation member 30 is provided above the mount support part 8 of the vibration reception part 3. The regulation member 30 includes a sandwiching part 32, an opposing protruding part 33, an arch part 31, and a compression part 34.

The regulation member 30 is formed in a U shape that opens downward in a front view seen from the third direction D3. The regulation member 30 of the present embodiment is formed of a resin material such as nylon 66 or plastron.

Figure 6:
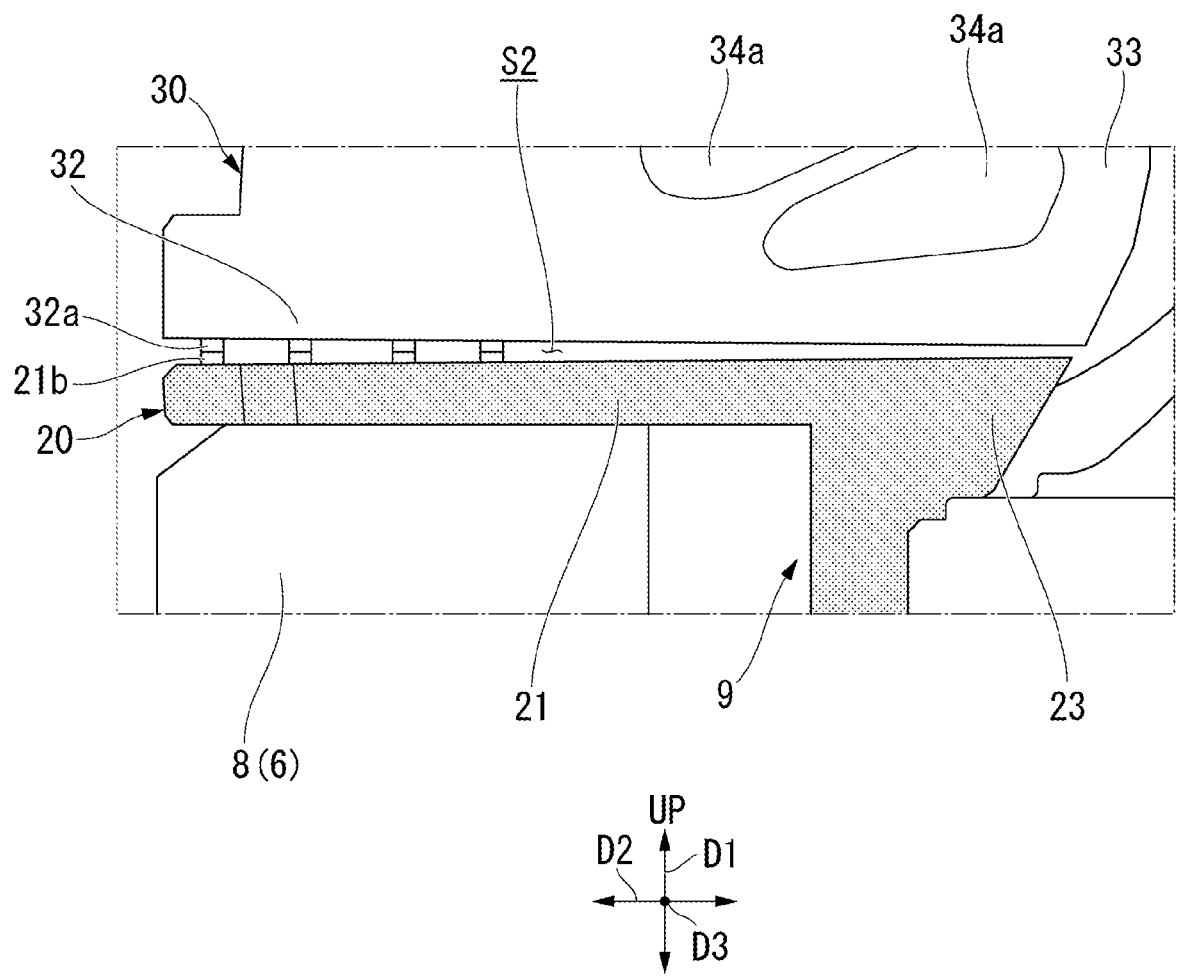
FIG. 6 is an enlarged view of a VI part of FIG. 2.

As shown in FIG. 1 and FIG. 2, the sandwiching part 32 is arranged above each movable part 21, and the sandwiching part 32 and the leg part 40 sandwich each movable part 21 in the first direction D1. A penetration hole 35 that penetrates through the sandwiching part 32 in the first direction D1 is formed in the sandwiching part 32 at a position that overlaps with the penetration hole 21a of the movable part 21 in a plan view. As shown in FIG. 6, a protrusion portion (spacer part) 32a that protrudes downward is formed on a lower surface of the sandwiching part 32. A plurality of protrusion portions 32a are formed on the lower surface of the sandwiching part 32 at intervals so as to surround the penetration hole 35. The protrusion portion 32a of the present embodiment overlaps with the protrusion portion 21b of the movable part 21 described above in a plan view.

The sandwiching part 32 is connected to the movable part 21 via a joint member 50 fitted to the penetration holes 21a and 35. The joint member 50 is formed in a cylindrical shape in which the first direction D1 is an axial direction. As shown in FIG. 1 and FIG. 5, a fastening member 60 that penetrates through the joint member 50 from above is fastened or the like to the attachment hole 8a of the leg part 40, and thereby, the sandwiching part 32, the movable part 21, and the leg part 40 are fixed in the order of the sandwiching part 32, the movable part 21, and the leg part 40. At this time, the sandwiching part 32 and the movable part 21 face each other in a state where the protrusion portions 21b and 32a are butted to each other. Therefore, a gap S2 is provided between a lower surface of the sandwiching part 32 and an upper surface of the movable part 21 in the first direction D1. That is, the protrusion portions 21b and 32a function as a spacer part for forming the gap S2 between the lower surface of the sandwiching part 32 and the upper surface of the movable part 21. An assembly method of the mount support part 8, the mount-holding part 20, and the regulation member 30 can be appropriately changed.

The opposing protruding part 33 extends inward in the second direction D2 from the sandwiching part 32. The opposing protruding part 33 faces a front end portion (a portion that extends inward (vibration absorption part 10 side) in the second direction D2 from the leg part 40) of the movable part 21 in the first direction D1. In the present embodiment, the opposing protruding part 33 faces the front end portion of the movable part 21 throughout the entire second and third directions D2 and D3. However, the opposing protruding part 33 may face at least partially the front end portion of the movable part 21.

A lower surface of the opposing protruding part 33 is located on the same plane as a lower surface of the sandwiching part 32. Accordingly, the gap S2 described above is formed throughout between the top surface of the movable part 21, and the sandwiching part 32 and the opposing protruding part 33. The opposing protruding part 33 limits the displacement of the movable part 21 by the movable part 21 approaching or coming into contact with the opposing protruding part 33 from below when the movable part 21 is elastically deformed. The spacer part described above may be a part in which the protrusion portions 21b and 32a are provided on any of the movable part 21 and the sandwiching part 32 as long as the spacer part forms the gap S2. A spacer part as a separate body from the movable part 21 and the sandwiching part 32 may be interposed.

The arch part 31 connects together the pair of opposing protruding parts 33. Specifically, the arch part 31 includes an upper extension section 31a that extends upward from each opposing protruding part 33, a side extension section 31b that connects together upper end portions of upper extension sections 31a, and a rib section 37.

An upper end portion of the upper extension section 31a is located at a higher position than an upper end portion of the vibration absorption part 10 (elastic body 11). A side wall part 36 is formed on both end portions in the third direction D3 of the upper extension section 31a.

The side extension section 31b bridges the vibration absorption part 10 in the second direction D2 above the vibration absorption part 10. That is, the side extension section 31b faces, in the first direction D1, the elastic body 11 above the elastic body 11. The side extension section 31b limits the displacement of the vibration absorption part 10 to the first direction D1 by the vibration absorption part 10 approaching or coming into contact with the side extension section 31b from below. The side extension section 31b may face, in the first direction D1, the support bracket 5.

The rib section 37 is defined by a recess portion that opens at an upper surface of the side extension section 31b. A plurality of (for example, three) rib sections 37 extend in the second direction D2 and is formed at equal intervals in the third direction D3. The rib section 37 is formed collectively by injection molding, for example, at the time of molding of the regulation member 30.

Compression parts 34a and 34b are, for example, a first compression part 34a formed on the upper extension section 31a and a second compression part 34b formed on the side extension section 31b. Each of the compression parts 34a and 34b is post-processed by a press process or the like after the molding of the regulation member 30 and is recessed on the other side of the third direction D3.

The first compression part 34a is formed such that recess portions formed in a triangular shape in a front view are aligned in the first direction D1. The first compression part 34a is formed on each upper extension section 31a at positions that are linearly symmetrical with respect to a virtual line that extends in the first direction D1 through the center in the second direction D2 of the regulation member 30. In the first direction D1, the first compression part 34a is formed on a portion of the upper extension section 31a that is located at a lower position than an upper end edge of the elastic body 11. However, the position, the shape, and the like of the first compression part 34a can be appropriately changed.

The second compression part 34b is formed on a portion of the side extension section 31b that faces, in the first direction D1, an upper end part of the elastic body 11. In the present embodiment, the second compression part 34b is formed such that recess portions having an oval shape in a front view are aligned in the second direction D2.

[Operation]

Next, an operation of the antivibration unit attachment structure 1 is described.

In the following, operations of a case where a low-frequency vibration acts, a case where a high-frequency vibration acts, and a case where an excessive vibration is input are described.

At the time of idling, at the time of low-speed traveling, or the like, a low-frequency vibration generated at the vibration generation part 2 is input to the antivibration unit 9 via the support bracket 5. In the present embodiment, the vibration absorption part 10 (elastic body 11) of the antivibration unit 9 is set to have an elastic coefficient such that the resonant frequency is included in the low-frequency band. Therefore, in response to the low-frequency vibration, the elastic body 11 or the diaphragm 12 is elastically deformed, and a liquid flows back and forth between the main liquid chamber and the sub-liquid chamber through the orifice flow path. Thereby, the low-frequency vibration is attenuated.

On the other hand, the mount-holding part 20 of the antivibration unit 9 is set to have an elastic coefficient such that the resonant frequency is included in the medium-to-high-frequency band. Therefore, at the time of normal traveling or the like, the mount-holding part 20 resonates with a medium-to-high-frequency vibration generated at the vibration generation part 2. Specifically, the movable part 21 is elastically deformed in the first direction D1, and thereby, the antivibration unit 9 (the vibration absorption part 10 and the mount-holding part 20) is displaced in the first direction D1 together with the vibration generation part 2. At this time, the vibration generation part 2 or the vibration absorption part 10 becomes a mass to elastically deform the movable part 21, and thereby, the medium-to-high-frequency vibration is attenuated.

In a case where an excessive vibration is input to the antivibration unit attachment structure 1, the movable part 21 is deflected and deformed greatly in the first direction D1. At this time, the movable part 21 comes into contact with a lower surface of the opposing protruding part 33 from below, or the elastic body 11 comes into contact with the side extension section 31b from below. Thereby, the deformation of the movable part 21 is limited in a predetermined range.

[Advantage]

As described above, the configuration of the present embodiment includes the mount-holding part 20 that holds the vibration absorption part 10 and that is elastically deformable in the first direction D1.

According to the configuration, the vibration absorption part 10 (elastic body 11) and the mount-holding part 20 are elastically deformed in response to a vibration generated at the vibration generation part 2, and thereby, it is possible to attenuate the vibration. Thereby, it is possible to prevent the vibration from being transmitted to the vibration reception part 3.

Specifically, in the configuration of the present embodiment, the elastic coefficients of the elastic body 11 and the mount-holding part 20 (movable part 21) are different from each other.

According to this configuration, it is possible to differentiate resonant frequencies of the elastic body 11 and the movable part 21 from each other, and it is possible to effectively attenuate vibrations of different frequency bands. In this case, it is possible to attenuate the vibration in the low-frequency region by elastic deformation of the elastic body 11, and it is possible to attenuate the vibration in the medium-to-high-frequency region by elastic deformation of the movable part 21.

Further, in the configuration of the present embodiment, the vibration reception part 3 includes the regulation member 30 that comes into contact with at least one of the vibration absorption part 10 and the mount-holding part 20 and that limits the displacement of the movable part 21 to the first direction D1.

According to this configuration, when the movable part 21 is elastically displaced together with the vibration absorption part 10 relative to the vibration reception part 3, for example, due to an excessive vibration, at least one of the vibration absorption part 10 and the movable part 21 comes into contact with the regulation member 30, and thereby, it is possible to limit the displacement of the movable part 21 to the first direction D1. Thereby, it is possible to prevent the mount-holding part 20 from being damaged when an excessive vibration is input.

In the configuration of the present embodiment, the regulation member 30 includes the opposing protruding part 33 that faces, in the first direction D1, the front end portion of the movable part 21 and that limits displacement of the movable part 21.

According to this configuration, in accordance with the upward displacement of the movable part 21, the movable part 21 comes into contact with the opposing protruding part 33, and thereby, it is possible to limit deformation of the movable part 21. Specifically, the opposing protruding part 33 comes into direct contact with the movable part 21 itself, and thereby, it is possible to stabilize the vibration of the movable part 21.

In the configuration of the present embodiment, the opposing protruding part 33 faces, in the second direction D2 throughout, the front end portion of the movable part 21.

According to this configuration, since the contact area between the regulation member 30 (opposing protruding part 33) and the front end portion of the movable part 21 becomes larger, it is possible to further stably limit the deformation of the movable part 21. Further, when the movable part 21 and the opposing protruding part 33 come into contact with each other, it is possible to reduce an impact load that acts between the movable part 21 and the opposing protruding part 33, and therefore, it is possible to improve durability.

In the configuration of the present embodiment, the projection portion 42 that projects upward, that comes into contact with the support bracket 5, and that limits displacement of the elastic body 11 to the first direction D1 is provided on the bridge part 41.

According to this configuration, the support bracket 5 comes into contact with the projection portion 42, and thereby, it is possible to limit the displacement of the elastic body 11 to the first direction D1. Thereby, it is possible to prevent the vibration absorption part 10 or the mount-holding part 20 from being greatly deformed due to an excessive vibration input from the vibration generation part 2. Therefore, it is possible to prevent stress concentration generated at the movable part 21.

Further, a portion of the bridge part 41 is projected as the projection portion 42, and thereby, it is possible to reduce the size or the weight of the vibration reception part 3 compared to a case in which the entire bridge part 41 is projected.

In the configuration of the present embodiment, a spacer part (the protrusion portions 21b and 32a) that forms a gap S2 in the first direction D1 between the opposing protruding part 33 and the movable part 21 is provided on the sandwiching part 32 and the movable part 21.

According to this configuration, the gap S2 is actively formed between the opposing protruding part 33 and the movable part 21 by the spacer part, and thereby, the movable part 21 is easily vibrated in the first direction D1 such that the sandwiching part 32 is a pivot point. Thereby, it is possible to effectively prevent the vibration.

In the configuration of the present embodiment, the vibration absorption part 10 is held by the holder part 22 that opens to the upward direction.

According to this configuration, the center of gravity of the vibration absorption part 10 is easily located at a lower position than the movable part 21. Thereby, it is possible to easily stabilize the vibration of the movable part 21 while stably holding the vibration absorption part 10.

Further, in the present embodiment, since the vibration absorption part 10 is engaged with the engagement part 23, it is possible to prevent the vibration absorption part 10 from being displaced or dropping out relative to the holder part 22, and it is possible to stably hold the vibration absorption part 10.

In the configuration of the present embodiment, the regulation member 30 includes the arch part 31 that straddles the vibration absorption part 10 from above, and the arch part 31 faces the elastic body 11 in the first direction D1 and limits displacement of the elastic body 11.

According to this configuration, when the elastic body 11 is displaced, by coming into contact with the arch part 31, it is possible to prevent the displacement of the vibration absorption part 10 in the first direction D1.

In the configuration of the present embodiment, the regulation member 30 includes the compression parts 34a and 34b further compressed than another part by a press process.

According to this configuration, since the resin material is compressed, the resin density of the compressed portion is increased, and the strength of the regulation member 30 is increased. Thereby, in a case where at least one of the vibration absorption part 10 and the mount-holding part 20 comes into contact with the regulation member 30, it is easier to prevent the regulation member 30 from being damaged or the like.

Other Modification Examples

Although an embodiment of the present invention has been described above, the present invention is not limited to the embodiment. Addition, omission, substitution, and other modifications of a configuration can be made without departing from the scope of the invention. The present invention is not limited by the above-described description but is limited only by the appended claims.

As a modification example, even when the "one member" and the "another member (the other member)" of the vibration generation part 2 and the vibration reception part 3 of the present embodiment are opposite, it is possible to obtain a similar advantage. That is, the above embodiment is described using a configuration in which the vibration absorption part 10 is connected to the vibration generation part 2, and the mount-holding part 20 is connected to the vibration reception part 3; however, the embodiment is not limited thereto. The mount-holding part 20 may be connected to the vibration generation part 2, and the vibration absorption part 10 may be connected to the vibration reception part 3.

The elastic coefficient of the mount-holding part 20 may be lower than the elastic coefficient of the elastic body 11.

That is, the low-frequency vibration may be attenuated by the mount-holding part 20, and the medium-to-high-frequency vibration may be attenuated by the elastic body 11 (vibration absorption part 10).

The above embodiment is described using a configuration in which the mount-holding part 20 is integrally formed; however, the embodiment is not limited to this configuration. For example, the mount-holding part 20 may be formed such that the movable part 21 is a separate body from the holder part 22.

The above embodiment is described using a configuration in which the regulation member 30 is capable of coming into contact with both the vibration absorption part 10 and the mount-holding part 20; however, the embodiment is not limited to this configuration. The regulation member 30 may have a configuration that comes into contact with any of the vibration absorption part 10 and the mount-holding part 20 and thereby limits displacement of the mount-holding part 20 (movable part 21).

Although the above embodiment is described using a configuration in which the regulation member 30 comes into contact with the movable part 21 at the opposing protruding part 33, the regulation member 30 may have a configuration that comes into contact with the holder part 22 or the like and limits displacement of the movable part 21.

The above embodiment is described using a configuration in which the antivibration unit 9 supports the vibration generation part 2 from below; however, the embodiment is not limited to this configuration. The antivibration unit 9 may have a configuration that suspends the vibration generation part 2 from above.

The above embodiment is described using a configuration in which a spacer part is interposed between the sandwiching part 32 and the leg part 40; however, the embodiment is not limited to this configuration. For example, a gap to which the movable part 21 is deformable may be generated between the sandwiching part 32 and the movable part 21 by the weight or the like of the vibration generation part 2.

The constitution element in the embodiment described above can be appropriately replaced by a known constitution element without departing from the scope of the invention, and the modification examples described above may be suitably combined.

What is claimed is:

1. An antivibration unit attachment structure, comprising:
  a vibration absorption part having a first elastic member which is elastically deformable in a first direction and which is connected to one member that is one of a vibration generation part and a vibration reception part; and
  a second elastic member which supports the vibration absorption part and which is connected to another member that is the other of the vibration generation part and the vibration reception part,
  wherein the second elastic member comprises a movable part that extends from the vibration absorption part to both sides at least in a second direction intersecting the first direction and that is supported by the other member,
  the second elastic member is elastically deformable in the first direction and has an elastic coefficient different from that of the first elastic member,
  the vibration reception part comprises a regulation member that comes into contact with at least one of the vibration absorption part and the second elastic member and that limits displacement of the second elastic member to the first direction,
  the other member comprises a leg part that supports the movable part, and
  the regulation member comprises an opposing protruding part that faces, in the first direction, a portion of the movable part that extends from the leg part toward the vibration absorption part and that limits displacement of the movable part.

2. The antivibration unit attachment structure according to claim 1,
  wherein the opposing protruding part faces, in the second direction throughout, the portion of the movable part that extends from the leg part toward the vibration absorption part.

3. The antivibration unit attachment structure according to claim 1,
  wherein the other member comprises a bridge part that connects together portions of the leg part that face each other in the second direction, and
  a projection portion that projects in the first direction, that comes into contact with at least one of the vibration absorption part and the one member, and that limits displacement of the first elastic member to the first direction is provided on a portion of the bridge part that overlaps at least one of the vibration absorption part and the one member when seen from the first direction.

4. The antivibration unit attachment structure according to claim 1,
  wherein the regulation member comprises a sandwiching part, the sandwiching part and the leg part sandwiching the movable part, and
  a spacer part that forms a gap in the first direction between the opposing protruding part and the movable part is provided on at least one of the sandwiching part and the movable part.

5. An antivibration unit attachment structure, comprising:
  a vibration absorption part having a first elastic member which is elastically deformable in a first direction and which is connected to one member that is one of a vibration generation part and a vibration reception part; and
  a second elastic member which supports the vibration absorption part and which is connected to another member that is the other of the vibration generation part and the vibration reception part,
  wherein the second elastic member comprises a movable part that extends from the vibration absorption part to both sides at least in a second direction intersecting the first direction and that is supported by the other member,
  the second elastic member is elastically deformable in the first direction and has an elastic coefficient different from that of the first elastic member,
  the vibration reception part comprises a regulation member that comes into contact with at least one of the vibration absorption part and the second elastic member and that limits displacement of the second elastic member to the first direction, and
  the second elastic member comprises
  a holder part that opens to one direction in the first direction and that holds the vibration absorption part, and an engagement part that extends inward from an open edge of the holder part and that engages with the vibration absorption part from the one direction in the first direction.

6. An antivibration unit attachment structure, comprising:
a vibration absorption part having a first elastic member which is elastically deformable in a first direction and which is connected to one member that is one of a vibration generation part and a vibration reception part; and
a second elastic member which supports the vibration absorption part and which is connected to another member that is the other of the vibration generation part and the vibration reception part,
wherein the second elastic member comprises a movable part that extends from the vibration absorption part to both sides at least in a second direction intersecting the first direction and that is supported by the other member,
the second elastic member is elastically deformable in the first direction and has an elastic coefficient different from that of the first elastic member, the vibration reception part comprises a regulation member that comes into contact with at least one of the vibration absorption part and the second elastic member and that limits displacement of the second elastic member to the first direction,
the regulation member comprises an arch part that straddles the first elastic member in the first direction, and
the arch part faces the first elastic member in the first direction and limits displacement of the first elastic member.

7. The antivibration unit attachment structure according to claim 1,
wherein the regulation member is formed of a resin material, and
the regulation member comprises a compression part further compressed than another part by a press process.

* * * * *